3,444,243
PROCESS FOR THE PREPARATION OF
BETA-HALOGEN ETHERS
Carlo Bujtar, Ferrara, and Emilio Martini, Bologna, Italy, assignors to Montecatini Edison S.p.A., Milan, Italy, a corporation of Italy
No Drawing. Filed Jan. 10, 1966, Ser. No. 519,420
Claims priority, application Italy, Jan. 13, 1965, 566/65
Int. Cl. C07c *41/10, 41/00, 41/06*
U.S. Cl. 260—611               8 Claims

ABSTRACT OF THE DISCLOSURE

Preparation of beta-halogen ethers by reacting (1) an olefin with (2) an alcohol or a phenol and (3) a halogen in the presence of (4) an excess of anionic ion-exchange resin adsorbent based on amount of halogen present.

---

This invention relates to a process for the preparation of beta-halogen ethers (e.g., alkyl halohydrins). More particularly, it relates to the preparation of beta-chloroethers, beta-bromoethers or beta-iodoethers having the general formula:

wherein $R_1$, $R_2$ and $R_3$ are selected from the group consisting of hydrogen and substituted and unsubstituted alkyl, aralkyl, aryl and cycloalkyl radicals or $R_2$ and $R_3$ may, taken together and in conjunction with the alpha and beta carbon atoms, C, form a cycloaliphatic ring, $R_4$ is a substituted or unsubstituted alkyl, aralkyl, aryl or cycloalkyl radical, and X is chlorine, bromine or iodine.

Many processes for the synthesis of beta-halogen ethers have been developed in the art. These processes, through the formation by dehydrohalogenation of intermediates consisting of 1-alkenyl-alkyl-ethers and successive reaction of these intermediates with organic hydroperoxides under suitable conditions, lead to the formation of peroxyethers.

One of the earliest known processes, involving the direct halogenation of ethers with, e.g., chlorine, has the disadvantage of poor selectivity leading to the production of mixed chloro-derivatives containing chlorine in different positions and in different amounts, and consequently to low yields of the beta-halogenated product.

Another method, consisting of the etherification of chlorohydrins with alcohols, leads to the formation of beta-halogenated ethers but is nevertheless limited by leading mostly to the production of symmetrical haloethers due to the reaction of mainly two moles of chlorohydrin together.

In more recent years, a method has been developed which consists of the addition of an organic hypohalide to olefins in the presence of alcohols and of p-toluensulfonic acid as catalyst. This method leads to the production, with good yields, of beta-halogenated ethers but involves, nevertheless, a certain danger owing to the easy decomposition of the organic hypohalide and its consequent tendency to explode.

Better results have been obtained by carrying out the synthesis of the hypohalide "in situ" during the addition reaction, by adding the halogen to a mixture of alcohol and olefin which mixture contains a basic substance which is capable of neutralizing the hydrohalogen acid formed through the reaction, the basic substance consisting, for instance, of mercuric oxide (Carius, Annalen, 165, 197 (1863)), silver nitrate (Meinel, Annalen, 516, 231 (1935)) or calcium carbonate (Seleznev-Balakirev, Zhur. Priklad. Kim., 27, 650–5 (1954)).

However, this method, although it has the advantage of reducing the danger of the previous hypohalide method, does not lend itself to a continuous process, owing to the nature of the substances employed to neutralize the hydrohalogen acids. Thus, on the one hand, the filling of absorbing towers with substances such as silver nitrate and mercuric oxide is economically unfeasible, while, on the other hand, the use of the more economical calcium carbonate would be impractical due to its tendency to knead or form a solid cake in the column.

An object of the present invention is thus to provide a process for the synthesis of beta-halogen ethers which is not subject to the limitations discussed above and which permits performance of the synthesis as a continuous process.

We have, in fact, surprisingly found that it is possible to synthesize the beta-halogen ethers by treatment of an olefin compound with a hydroxy compound and with a halogen, in the presence of an excess of an absorbing substance, namely, an anionic exchange resin.

The more evident advantages of the present invention reside in that the process can be carried out both discontinuously and continuously and in the possibility of regenerating the exhausted exchange resin, by processes known in the art, and this fact makes very economical the use of these substances as absorbers in the above mentioned process.

The present invention therefore provides a process for the batchwise or the continuous synthesis of beta-halogen ethers having the general formula:

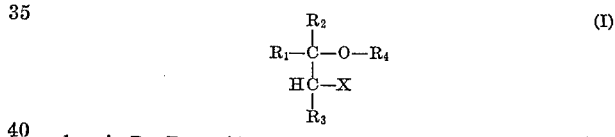

wherein $R_1$, $R_2$ and $R_3$ are selected from the group consisting of hydrogen and substituted and unsubstituted alkyl, aralkyl, aryl, alkylaryl and cycloalkyl radicals or $R_2$ and $R_3$ may, taken together and in conjunction with the alpha and beta carbon atoms, C, form a cycloaliphatic ring, $R_4$ is a substituted or unsubstituted alkyl, aralkyl, aryl or cycloalkyl radical, and X is chlorine, bromine or iodine, by reacting an olefin of the type $R_1R_2C=CHR_3$ with an alcohol or a phenol of the type $R_4OH$ and with the halogen $X_2$ (wherein $R_1$, $R_2$, $R_3$, $R_4$ and X are as defined above in Formula I in the presence of an excess of anionic ion-exchange resin (in its free base form).

The presence of solvents is not required, although permissible, because it is generally preferred to use an excess of the reacting alcohol in order to suppress secondary reactions which lead to the formation of addition products between the olefin and the halogen.

The beta haloethers which can be prepared according to the process of the present invention include the following representative compounds:

methyl-beta-chloroethyl ether
ethyl-beta-chloroethyl ether
isopropyl-beta-chloroethyl ether
phenyl-beta-chloroethyl ether
cyclohexyl-beta-chloroethyl ether
methyl-beta-chloro-isopropyl ether
ethyl-beta-chloro-isopropyl ether
isopropyl-beta-chloro-isopropyl ether
phenyl-beta-chloro-isopropyl ether
cyclohexyl-beta-chloro-isopropyl ether
methyl-1-chloro-2-methyl-isopropyl ether
ethyl-1-chloro-2-methyl-isopropyl ether isopropyl-1-chloro-2-methyl-isopropyl ether
1-methoxy-2-chloro-cyclohexane
1-ethoxy-2-chloro-cyclohexane
alpha methoxy-beta-chloro-ethylbenzene
alpha ethoxy-beta-chloro-ethylbenzene
alpha propoxy-beta-chloro-ethylbenzene
alpha butoxy-beta-chloro-ethylbenzene and the corresponding bromine and iodine compounds.

The anion exchange resins employed as adsorbent substances for the purposes of the present invention include, e.g., cross-linked polystyrene containing quaternary ammonium groups or substituted amines such as —N($C_3H_8$)$_2$ groups, polycondensation products of phenol and formaldehyde containing amino groups, polymerization products of aromatic amines and formaldehyde, guanidine-formaldehyde resins, polyamines, phenol-formaldehyde resins, etc., and are available commercially under such trade names as:

Amberlite (types IR–4B, IR–45, IRA–4 10, IRA 400) (Rohm & Haas).
Dowex (types 1 and 2) (Dow Corning).
Wofatite M (I. G. Farben).
Permutit S (Permutit A.G.).
Kastel A–300 etc. (Montecatini).

These resins may be employed for the purposes of the present invention both for a continuous process, e.g., as a solid bed, and for a batchwise process, provided that an excess based on the quantity of the halogen present is emloyed. Of course, these resins must be in the basic form.

The halogens may be chlorine, bromine or iodine, chlorine being particularly preferred.

Suitable hydroxy reactants for use according to the present invention include: methanol, ethanol, butanols, pentanols, hexanols, heptanols, octanols, cyclohexanols, terpenols, phenols, etc., and are used in excess of the stoichiometric amounts required to react with the halogen.

The monolefin compounds which react with the alcohols and halogens in the process of the present invention include: ethylene, propylene, butene-1, butene-2, isobutene, diisobutene, pentenes, cyclopentene and derivatives thereof, styrene, divinylbenzene, etc.

The present process may conveniently take place at various temperatures, depending on the reactivity of the alcohols used. In the presence of methanol, for instance, it will be suitable to employ a temperature range of between about 0 and 10° C., while with butanol temperatures around 40° C. are more suitable. A temperature range having general applicability is one between about —10 and +120° C., preferably between about 0 and 40° C.

The following examples serve to further illustrate the present invention but are not intended to limit the scope thereof.

Example 1.—Preparation of 1-chloro-2-ethoxy propane

One mole of chlorine and 1.2 moles of propylene were bubbled through two different pipes into a suspension consisting of 600 g. of anion exchange resin (Kastel A–300) commercial name of cross-linked polystyrene containing alkyl-substituted tert. amino groups in 400 cc. of ethanol, at a temperature of about 0° C., for about 3 hours, the flow rates being such as to maintain the reaction temperature betwene 0 and 5° C., while the suspension was kept under strong agitation. Then the liquid reaction product was separated from the resin and the ethanol was distilled off through a Widmar column until the boiling point of the liquid residue increased from about 50° to 80° C. The cooled residue was poured into water and the upper organic layer was separated and washed three times with water and subsequently dried over anhydrous $Na_2SO_4$.

The thus obtained crude product, which weighed 101 g. (yield=86%), was subjected to a fractional distillation. The fraction which distilled between 116 and 118° C. was collected and said fraction was found to correspond to 1-chloro-2-ethoxy propane having the following characteristics:

| | Found | Calculated |
|---|---|---|
| $d_4^{20}$ | 0.9993 | |
| $nS^{20}$ | 1.4183 | |
| Carbon, percent | 47 | 48.95 |
| Hydrogen, percent | 8.73 | 8.95 |
| Chlorine, percent | 29.1 | 28.0 |

This fraction weighed 67 g., corresponding to a yield of 55%, calculated on chlorine.

Example 2.—Preparation of alpha-methoxy-beta-chloro-ethylbenzene 600 g. of anion exchange resin (Kastel A–300), 300 cc. of methanol and 52 g. of freshly distilled styrene were introduced into a flask provided with a reflux condenser and chlorine inlet. Bubbling of chlorine was started through the suspension, keeping the temperature of the reaction mixture between 5 and 10° C. The addition of chlorine was continued until, by weighing the flask, it was observed that the calculated amount of chlorine had been adsorbed. Then the reaction mixture was filtered to separate the resin, the resin was washed with 200 cc. of ether and the wash ether combined with the liquid reaction mixture. Then the ether and the excess methanol were evaporated by distillation.

The residue was then fractioned under vacuum. The fraction which distilled at 73–75° C. at 2.5 mm. Hg was collected and found to have the following characteristics:

| | Found | Calculated |
|---|---|---|
| $d_4^{20}$ | 1.1216 | |
| $n_4^{20}$ | 1.5307 | |
| Chlorine, percent | 21.6 | 20.8 |
| Carbon, percent | 62.9 | 63.2 |
| Hydrogen, percent | 6.51 | 6.44 | corresponding to the formula

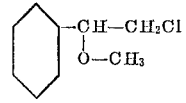

Example 3.—Preparation of alpha-methoxy-beta-iodo-ethylbenzene 104 g. of styrene dissolved in 100 cc. of ether were added slowly and under strong agitation, keeping the temperature between 0 and 5° C., to a suspension consisting of 500 g. of Kastel A–300 resin in 600 cc. of ethyl ether and 100 cc. of methanol, containing dissolved therein 254 g. of iodine. When all the styrene was added, the iodine was substantially completely reacted. The reaction product was filtered to remove the resin, and the resin washed with 150 cc. of ethyl ether. The ether solution, including the resin washing solution, was washed with a saturated solution of $Na_2SO_3$ in order to decolor the unreacted iodine, then washed with water, and subsequently dried over anhydrous $Na_2SO_4$ and the ether distilled off. The residue was crude alpha-methoxy-beta-iodo-ethylbenzene, which was purified by distillation under vacuum. (It is not advisable to distill at atmospheric pressure, B.P. 252° C., owing to the easy decomposition of the iodine derivative.) The product boiled at 72° C./0.2 mm. Hg and had the following characteristics:

| | Found | Calculated |
|---|---|---|
| $d_4^{20}$ | 1.5700 | |
| Carbon, percent | 39.4 | 41.3 |
| Hydrogen, percent | 4.35 | 4.2 |
| Iodine, percent | 49.2 | 48.4 |

The yield as pure product is 67%.

Example 4.—Preparation of 1-chloro-2-tert. butoxy propane

By replacing the ethanol in Example 1 with tert. butanol, 1-chloro-2-tert. butoxypropane was obtained in yield of 26%. This product had the following characteristics (boiling point=122–123° C.):

|  | Found | Calculated |
| --- | --- | --- |
| $nS^{20}$ | 1.425 |  |
| $d_4^{20}$ | 0.9426 |  |
| Carbon, percent | 55.1 | 54.7 |
| Hydrogen, percent | 9.8 | 9.96 |
| Chlorine, percent | 24.2 | 23.5 |

Example 5.—Preparation of 1-chloro-2-phenyloxy propane

Into a suspension consisting of 600 g. of anion exchange resin (Kastel A–300) in a solution of 350 cc. of benzene and 44 g. of phenol, kept at 20–25° C., were bubbled 1 mole of chlorine and 1.1 moles of propylene through two pipes having inlets on the bottom of the vessel. The reacting gas flow was adjusted in such manner as to maintain the temperature constant at 25° C. and the suspension was constantly kept under strong agitation. Then the liquid reaction product was separated from the resin and the resin washed with 100 cc. of benzene which were then added to the filtrate. The benzene solution was subsequently washed with an aqueous 15% NaOH solution and dried over anhydrous $Na_2SO_4$.

Benzene was then distilled off and the residue fractionated under vacuum. 1-chloro-2-phenyloxy propane was collected at 110–112° C./20 mm. Hg, the product having the following characteristics:

|  | Found | Calculated |
| --- | --- | --- |
| $d_4^{20}$ | 1.1024 |  |
| $n_D^{20}$ | 1.5250 |  |
| Carbon, percent | 62.9 | 63.2 |
| Hydrogen, percent | 6.51 | 5.45 |
| Chlorine, percent | 21.2 | 20.8 |

Example 6.—Continuous preparation of alpha-ethoxy-beta-iodoethylbenzene

A column (inside diameter 40 mm., length 2,500 mm.) provided with an outside cooling jacket was packed with anion exchange resin (Kastel A–300) and cooled by circulation of brine at 0° C. in the outside jacket. From two separated vessels (a) a solution of iodine in a mixture of ethanol and ether (1:1 by volume) containing 1 mole of $I_2$/liter and (b) a solution of styrene in ethanol containing 1 mole of styrene/liter, were passed downwards through the column at a flow rate of 15–20 cc./minute. The liquid coming out of the column and containing the alpha-ethoxy-beta-iodo-ethylbenzene product was distilled in order to remove the excess ether and ethanol, and the residue, after decoloration by washing with aqueous $Na_2SO_3$, was subjected to the same treatments described in Example 3, thus obtaining the alpha-ethoxy-beta-iodoethylbenzene in a yield of 42% as pure product.

Example 7.—Preparation of alpha-tert.butoxy-beta-iodo-ethylbenzene

By replacing the methanol in Example 3 with 150 cc. of tert.butanol and working at 25° C., alpha-tert.butoxy-beta-iodoethylbenzene having the following characteristics boiling point=93° C./0.2 mm. Hg):

|  | Found | Calculated |
| --- | --- | --- |
| $d_4^{20}$ | 1.5130 |  |
| Carbon, percent | 48.1 | 47.5 |
| Hydrogen, percent | 5.35 | 5.6 |
| Iodine, percent | 40.7 | 41.8 | was obtained in a yield of 31%.

Example 8.—Preparation of alpha-methoxy-beta-bromo-ethylbenzene 80 g. of bromine were added under agitation over 2 hours to a mixture consisting of 300 cc. of ether, 100 cc. of methanol, 54 g. of styrene and 400 g. of ion-exchange resin (Kastel A–300) kept at 10° C. by means of outside cooling.

Then the mixture was filtered to remove the resin and the ether solution washed first with a 5% NaOH solution and then with water and subsequently dried over anhydrous $Na_2SO_4$. The ether was then distilled off and the residue fractionated under vacuum. 67 g. (yield 62%) of a product boiling at 112–113° C. at 12 mm. Hg were obtained, which product was identified as alpha-methoxy-beta-bromo-ethylbenzene.

Having thus described our invention, what we desire to secure by Letters Patent and hereby claim is:

1. A process for the preparation of beta-halogen ethers which comprises reacting at a temperature of between about −10° C. and +120° C. (a) an olefin selected from the group consisting of ethylene, propylene, butene-1, butene-2, isobutene, diisobutene, pentene, cyclopentene, styrene and divinylbenzene with (b) a hydroxy compound selected from the group consisting of methanol, ethanol, butanol, pentanol, hexanol, heptanol, octanol, cyclohexanol, terpenol and phenol, and (c) a halogen selected from the group consisting of chlorine, bromine and iodine, in the presence of an excess, based on the amount of halogen present, of an anionic ion-exchange resin adsorbent in its free base form, the amount of said hydroxyl compound being in excess of the stoichiometric amount required to react with said halogen.

2. The process of claim 1 wherein said hydroxyl compound is selected from the group consisting of methanol, ethanol, tert. butanol and phenol.

3. The process of claim 1 wherein said olefin is selected from the group consisting of propylene and styrene.

4. The process of claim 1 wherein the reaction is carried out as a continuous or batchwise process.

5. The process of claim 1 wherein the ion-exchange resin is a cross-linked polystyrene containing alkylsubstituted tert. amino groups.

6. The process of claim 1 wherein the reaction temperature is between about 0° C. and 40° C.

7. The process of claim 6 wherein said hydroxyl compound is methanol and the reaction temperature is between about 0° C. and 10° C.

8. The process of claim 6 wherein said hydroxyl compound is butanol and the reaction temperature is about 40° C.

References Cited

UNITED STATES PATENTS 2,095,612  10/1937  Nutting et al. _____ 260—614

FOREIGN PATENTS 1,014,265  12/1965  Great Britain.

OTHER REFERENCES

Irwin et al., Jour. Amer. Chem. Soc., vol. 63 (1941) pages 858–860.

BERNARD HELFIN, *Primary Examiner.*

U.S. Cl. X.R.

260—612, 614

UNITED STATES PATENT OFFICE
CERTIFICATE OF CORRECTION

Patent No. 3,444,243                                              May 13, 1969

Carlo Bujtar et al.

It is certified that error appears in the above identified patent and that said Letters Patent are hereby corrected as shown below:

Column 2, line 51, "Formula I" should read -- formula (I)) --. Column 3, line 60, "-300)" should read -- -300 --; line 62, "groups" should read -- groups) --; line 65, "betwene" should read -- between --. Column 4, line 6, "$d_420$" should read -- $d_4^{20}$ --; line 7, "$nS^{20}$" should read -- $n_D^{20}$ --; line 34, "$d_4{}^{20}$" should read -- $d_4^{20}$ --; line 35, "$n_4{}^{20}$" should read -- $n_D^{20}$ --; line 71, "$d_4{}^{20}$" should read -- $d_4^{20}$ --. Column 5, line 9, "$nS^{20}$" should read -- $n_D^{20}$ --; line 10, "$d_4{}^{20}$" should read -- $d_4^{20}$ --; line 35, "$d_4{}^{20}$" should read -- $d_4^{20}$ --; line 36, "$n_D{}^{20}$" should read -- $n_D^{20}$ --; line 41, "iodoethylbenzene" should read -- iodo-ethylbenzene --; line 63, "iodoethylbenzene" should read -- iodo-ethylbenzene --; line 64, "Hg):" should read -- Hg --; line 67, $$d_4{}^{20} \quad\quad \text{should read} \quad\quad d_4^{20}$$

Signed and sealed this 24th day of March 1970.

(SEAL)
Attest:

EDWARD M. FLETCHER, JR.                          WILLIAM E. SCHUYLER, JR.
Attesting Officer                                                Commissioner of Patents